US006117557A

United States Patent [19]

Massie, II et al.

[11] Patent Number: 6,117,557

[45] Date of Patent: Sep. 12, 2000

[54] CAPROLACTONE ESTER POLYURETHANE DEVELOPER ROLLER

[75] Inventors: Johnny Dale Massie, II; Jean Marie Massie; Donald Wayne Stafford; Peter Eric Wallin, all of Lexington, Ky.

[73] Assignee: Lexmark International, Inc., Lexington, Ky.

[21] Appl. No.: 08/423,481

[22] Filed: Apr. 19, 1995

[51] Int. Cl.[7] ...................................................... B32B 27/40

[52] U.S. Cl. ....................... 428/425.9; 355/259; 355/274; 428/36.9; 428/36.91; 428/423.1; 428/425.8; 430/126; 492/56

[58] Field of Search .............................. 428/423.1, 425.8, 428/36.9, 36.91, 425.9; 355/259, 274; 430/126; 492/56

[56] References Cited

U.S. PATENT DOCUMENTS

| | | | |
|---|---|---|---|
| 5,156,915 | 10/1992 | Wilson et al. | 428/425.8 |
| 5,212,032 | 5/1993 | Wilson et al. | 430/65 |
| 5,217,838 | 6/1993 | Wilson et al. | 430/126 |
| 5,248,560 | 9/1993 | Baker et al. | 428/425.8 |
| 5,250,357 | 10/1993 | Wilson et al. | 428/425.8 |
| 5,434,653 | 7/1995 | Takizawa et al. | 355/259 |

*Primary Examiner*—D. S. Nakarani
*Attorney, Agent, or Firm*—John A. Brady

[57] ABSTRACT

A semiconductor developer roller having a conductive shaft and an outer member of caprolactone-ester-based polyurethane loaded with ferric chloride. The members have low environmental sensitivity and good electrical stability.

4 Claims, No Drawings

CAPROLACTONE ESTER POLYURETHANE DEVELOPER ROLLER

TECHNICAL FIELD

This invention relates to developer rollers used in electrophotography, and more specifically, to formulations to achieve stable performance over a wide range of environmental conditions of heat and humidity.

BACKGROUND OF THE INVENTION

The preferred embodiment of this invention is a modification or improvement over the invention disclosed in U.S. Pat. No. 5,248,560 to Baker et al, which discloses a developer roller of a metal shaft with outer roller material of metal-salt-filled urethane. That urethane is produced from polyester toluene diisocyanate and the metal salts specifically disclosed are copper (II) chloride and lithium chloride.

The materials used for rollers in the electrophotographic process must have specific electrical properties. The electrical resistivity typically must be in the range of $1\times10^7$ (one times 10 to the 7th power) to $1\times10^{13}$ ohm-cm, which is semiconductive. Polyurethane has resistivities of $1\times10^{10}$ to $1\times10^{15}$ ohm-cm. Therefore, conductive additives must be used to reduce the electrical resistivity to the desired value. Metal halides are commonly used as conductive additives. Only very small levels, less than 0.2% by weight, of metal halides are required to sufficiently lower the resistivity.

Unfilled urethanes usually show approximately an 18–170 times change in resistivity across environments. In accordance with this invention, this sensitivity was found to be related to the chemical structure of the urethane. Urethanes having caprolactone based polyester moieties have the best environmental sensitivity of any urethane. Their resistivity typically changes by approximately 18–40 times across environments, compared to 40–170 times for other types of poylurethanes which include adipic acid-based polyester urethanes and polyether urethanes. The addition of specific metal halides to the caprolactone-based urethanes reduces this humidity sensitivity to approximately 4–5 times across environments.

In addition, the roller material must have a hardness ranging from 40–60 Shore A, without the use of plasticizer, which can be detrimental to the photoconductor drum material. Also, the roller requires low compression set, less than 5%, to provide uniform printing performance.

In accordance with this invention the polyurethane diisocyanate and metal salt are different from the foregoing prior art to achieve a filled urethane useful as a developmental member which is stable across a wide range of temperature and humidity.

DISCLOSURE OF THE INVENTION

In accordance with the invention the outer, semiconductive material of a developer roller or like development member is polyurethane having caprolactone ester moieties, with small amounts of ferric chloride conductive additive. An inner, conductive member may be a metal shaft of the developer roller. These conductive, caprolactone-based urethanes have much lower environmental sensitivities compared to filled adipic acid-based polyester urethanes or polyether-based urethanes. Use of the caprolactone ester polyurethane with a wide range of salts as fillers, such as copper (II) chloride, NaI, CsI, or $LiClO_4$, achieve much of the advantages of this invention, particularly the reduced sensitivity to humidity.

BEST MODE FOR CARRYING OUT THE INVENTION

The preferred roller is made by liquid cast molding, in which two, separate parts of the following formula are combined in the mold. The entire preferred formula is as follows:

Preferred Formula

| Material By Source | Material By Name | Parts By Weight |
|---|---|---|
| Vibrathane 6060 (trademark product of Uniroyal Chemical Co.) | Polycaprolactone ester toluene-diisocyanate prepolymer | 100.00 |
| Voranol 234-630 (trademark product of Dow Chemical Co.) | Polyether polyol with with functionality of 3 | 6.8 nominal (see Note 1) |
| Ferric Chloride anhydrous, 98% pure (product of Aldrich Chemical Co., Inc.) | Fe(III) $Cl_3$ | 0.010 nominal (see Note 2) |
| Silicon oil, DC200 (trademark product of Dow Corning Corp.) | Polydimethylsiloxane, viscosity of 50 centistoke | 3.00 |
| DABCO T-12 catalyst (trademark product of Air Products and Chemicals, Inc.) | Dibutyltin dilaurate | 0.015 |

The intended stoichiometry of the alcohol functional groups with respect to the isocyanate functional groups is 95%.

Note 1: The equivalent weight of Voranol 234-630 polyol depends on the hydroxyl number of each lot of material. The method of calculation of the weight of the polyol is given in the associated product literature so as to adjust the equivalent weight of the Voranol based on the percent of isocyanate groups in the Vibrathane 6060 prepolymer. As an example, a lot of Voranol 234-630 polyol may have a hydroxyl number of 633.0. This is an equivalent weight of 88.6 gram per hydroxyl group. A lot of Vibrathane 6060 polyurethane may have an isocyanate content of 3.38 percent. Using these lots with the intended stoichiometry of 95%, the total weight of Voranol 234-630 polyol is 6.77 parts per 100 parts of Vibrathane 6060.

Note 2: The concentration of ferric chloride required for nominal resistivity is 0.010 parts per hundred prepolymer. However, the level of ferric chloride may require adjustment with each batch, which is determined by measuring the volume resistivity of each batch. Good operation occurs with the ferric chloride in the range of 0.008+0.012 parts per hundred prepolymer.

Processing

The Vibrathane 6060 prepolymer and the Voranol 234-630 polyol are each heated separately at 80 degrees C. for equilibration prior to mixing. This heating of the Vibrathane may require approximately 16 hours.

The ferric chloride is added to a small amount of the Voranol polyol and this mixture is heated at 120 degrees C. with agitation for 1 hour to thoroughly dissolve the ferric chloride. This ferric chloride and polyol mixture is then added to the balance of the polyol. The catalyst is added to this mixture with stirring.

The silicon oil is added to the Vibrathane 6060 prepolymer. The two mixtures are degassed and heated to a temperature for casting, typically 80 degrees C. Each mixture is delivered by separate conduit to a mixing head, which introduces the mixed material into a mold. The mold encircles a metal core so that a single molding operation forms a roller having a metal core with the cured material as a cylindrical body around the core.

Curing conditions may vary to optimize the roller in a particular molding environment. Recommended nominal conditions are mold cure of 30 minutes at 120 degrees C., and post cure (out of the mold) for 10 hours at 110 degrees C.

The resulting product is a roller for electrophotographic development in which a conductive metal core has a semiconductive outer body of a single material, that material being urethane with caprolactone ester moieties with ferric chloride as the conductive additive. During use the outer surface of the outer body during development holds charged toner particles and rotates that surface into contact with the surface of a photosensitive member having an electrostatic image, as is conventional.

Environmental Stability

The ratio of electrical volume resistivity at 60 degrees F. and 8 percent relative humidity (RH) to that at 78 degrees F. and 80 percent RH defines a Dry/Wet Resistivity Ratio. Tests show that this ratio is lower for the caprolactone polyester urethanes including the one in this invention than for adipic acid-based polyester urethanes and polyether based urethanes. For the Vibrathane 6060 caprolactone polyester urethane the ratio was the lowest. All of those materials have an acceptable compression set of less than 5% when curd with Voranol 234-630.

Th addition of a conductive additive such as ferric chloride and/or copper(II) chloride produces a lower Dry/Wet Resistivity Ratio. The use of ferric chloride lowers this ratio more than does copper(II) chloride. The preferred embodiment has a DC volume resistivity in ohm-cm as follows: $1.9\times10^9$ at 72 degrees F./50 percent RH; $1.2\times10^9$ at 78 degrees F./80 percent RH; and $4.6\times10^9$ at 60 degrees F./8 percent RH, a nominal value of $2\times10^9$ and a Dry/Wet Resistivity Ratio of 3.8. The hardness is 60 shore A (measured by ASTM D2240) and compression set of less than 5% (measured by ASTM D395, Method B). These are excellent properties for electrophotography.

Electrical Stability

Ion migration induced by a potential gradient is a known undesirable factor which degrades the electrical stability of urethanes filled with a metal halide conductive additive. Urethane samples loaded with a metal halide conductive additive were placed under a 1000 volt field and the direct current resistivity monitored over time. After 2 hours, the voltage was turned off and the resistivity periodically measured. Both ferric chloride and copper(II) chloride loaded urethanes show increases in resistivity with time while in the 1000 volt field, and their increases are similar. However, when the electrical field is removed, the resistivity of the ferric chloride loaded urethane recovers to its original value much more quickly than the copper chloride loaded urethane. This quicker recovery time gives the ferric chloride loaded urethane rollers of this invention improved printing performance over life compared to the copper chloride loaded materials.

In summary, the preferred embodiment has excellent environmental stability and good electrical recovery. It also has the physical properties which are important for insuring excellent printing performance. The preferred range for hardness is 40 to 60 Shore A and the compression set is required to be less than 5 percent. The low compression set prevents the appearance of bands in the print which are caused by a compressive load on the roller forming permanent flat spots. It is well known that the use of a plasticizer, such as dipropylene glycol dibenzoate, can reduce hardness of a urethane rubber system. However, a plasticizer can chemically interact with either or both the organic toner and the photoconductor, leading to degradation of those materials. Therefore, materials with low hardness achieved without the use of plasticizer are required for this application, as is achieved by this invention.

Variations in accordance with this invention can be anticipated.

We claim:

1. An endless developer member comprising an inner conductive member and an outer semiconductive member on said inner member, said outer member being a polyurethane formed by the reaction of a polycaprolactone ester toluene diisocyanate urethane prepolymer with a trifunctional polyether polyol at stoichiometry of about 95 percent alcohol functional groups to isocyanate functional groups, said polyurethane having a conductive filler of ferric chloride.

2. The developer member as in claim 1 in which said ferric chloride in said outer member is in an amount of about 0.01 parts by weight for each 100 parts by weight of said polycaprolactone ester toluene diisocyanate urethane prepolymer.

3. A developer roller comprising a conductive core and an outer semiconductive member on said core, said outer member being a polyurethane formed by the reaction of a polycaprolactone ester toluene diisocyanate urethane prepolymer with a trifunctional polyether polyol at stoichiometry of about 95 percent alcohol functional groups to isocyanate functional groups, said polyurethane having a conductive filler of ferric chloride.

4. The developer roller as in claim 3 in which said ferric chloride in said outer member is is an amount of about 0.01 parts by weight for each 100 parts by weight of said polycaprolactone ester toluene diisocyanate urethane prepolymer.

* * * * *